United States Patent
Bossert et al.

(10) Patent No.: US 8,111,660 B2
(45) Date of Patent: Feb. 7, 2012

(54) METHOD AND TRANSMITTER FOR TRANSMITTING DATA IN A MULTI-CARRIER SYSTEM VIA A NUMBER OF TRANSMITTING ANTENNAS

(75) Inventors: Martin Bossert, Ulm (DE); Elena Costa, München (DE); Axel Hübner, Ulm (DE); Matthias Lott, Neuried (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 1374 days.

(21) Appl. No.: 10/553,411

(22) PCT Filed: Mar. 17, 2004

(86) PCT No.: PCT/EP2004/002773
§ 371 (c)(1),
(2), (4) Date: Oct. 17, 2005

(87) PCT Pub. No.: WO2004/093344
PCT Pub. Date: Oct. 28, 2004

(65) Prior Publication Data
US 2006/0221898 A1 Oct. 5, 2006

(30) Foreign Application Priority Data
Apr. 16, 2003 (EP) .................................. 03008902

(51) Int. Cl.
*H04W 4/00* (2009.01)
*H04M 1/00* (2006.01)
(52) U.S. Cl. ...................... 370/330; 370/334; 455/562.1

(58) Field of Classification Search ............... 455/562.1, 455/561, 550.1; 370/330
See application file for complete search history.

(56) References Cited

U.S. PATENT DOCUMENTS

| | | | | |
|---|---|---|---|---|
| 6,785,520 | B2 * | 8/2004 | Sugar et al. ................... | 455/101 |
| 7,190,689 | B2 * | 3/2007 | Sato et al. ...................... | 370/344 |
| 2001/0033623 | A1 * | 10/2001 | Hosur ............................. | 375/267 |
| 2002/0142723 | A1 * | 10/2002 | Foschini et al. .................. | 455/59 |
| 2004/0081131 | A1 * | 4/2004 | Walton et al. .................. | 370/344 |
| 2008/0037685 | A1 * | 2/2008 | Giannakis et al. ............. | 375/299 |

OTHER PUBLICATIONS

Y.G. Li, J. C. Chuang, N.R. Sollenberger: "Transmitter Diversity for OFDM Systems and Its Impact on High-Rate Data Wireless Networks" pp. 1233-1243, (Jul. 1999).

(Continued)

*Primary Examiner* — Michael Thier
*Assistant Examiner* — Huy Ho
(74) *Attorney, Agent, or Firm* — Staas & Halsey LLP

(57) ABSTRACT

A method transmits data by radio during which a frequency band is split into a plurality of subcarriers, and a plurality of antennas are used for transmitting. The data are split into a number of elements, which are to be respectively transmitted by each antenna, said number of elements corresponding to the number of subcarriers, whereby for each antenna, each element is respectively assigned to a subcarrier for transmitting, and at least two antennas on at least one subcarrier transmit different elements. Before an OFDM modulation for each antenna, each element is multiplied by an antenna-specific and element-specific factor. Alternatively, after an OFDM modulation for at least one antenna, the time sequence of the time-dependent signal generated on the basis of the OFDM modulation is reordered. A transmitter carries out the method.

12 Claims, 1 Drawing Sheet

OTHER PUBLICATIONS

A. Dammann, S. Kaiser: "Low Complex Standard Conformable Antenna Diversity Techniques for OFDM Systems and Its Application to the DVB-T Systems" (total pp. 8) (Jan. 2002).

S.M. Alamouti: "A Simple Transmit Diversity Technique for Wireless Communications" pp. 1451-1458, (Oct. 1998).

M. Bossert et al., "On Cyclic Delay Diversity in OFDM Based Transmission Schemes" pp. 1-5 (2002).

J. Kwak: "Physical Layer Arq: New Proposed Feature FOR802:16AB" pp. 1-18, (Sep. 2001).

V. Tarokh, H. Jafarkhani, R. Calderbank, "Space-Time Block Codinng for Wireless Communications: Performance Results" pp. 451-459, (Mar. 1999).

* cited by examiner

METHOD AND TRANSMITTER FOR TRANSMITTING DATA IN A MULTI-CARRIER SYSTEM VIA A NUMBER OF TRANSMITTING ANTENNAS

CROSS REFERENCE TO RELATED APPLICATIONS

This application is based on and hereby claims priority to International Application No. PCT/EP2004/002773 filed on Mar. 17, 2004 and EP03008902 filed on April 16, 2003, the contents of which are hereby incorporated by reference.

BACKGROUND OF THE INVENTION

The invention relates to a method for transmitting data by radio and to a transmitter for transmitting data by radio via a number of antennas.

In radio communication systems data (for example speech, picture information, video information, SMS (Short Message Service) or other data) is transmitted with the aid of electromagnetic waves via a radio interface between sending and receiving stations. The electromagnetic waves in such systems are radiated using carrier frequencies which lie within the frequency range provided for the relevant system. A radio communication system in this case includes subscriber stations, e.g. mobile stations, base stations, e.g. node Bs or other radio access devices, as well as further network-side devices where required.

To guarantee that data is transmitted as efficiently as possible the overall frequency band available is divided up into a number of subcarriers (multi-carrier method). The basic idea underlying multi-carrier systems, also referred to as OFDM (Orthogonal Frequency Division Multiplexer) systems, is to translate the initial situation of the transmission of a broadband signal into the transmission of a quantify of narrowband orthogonal signals.

With OFDM time pulse shapes which are almost rectangular are used for the subcarriers. The frequency spacing of the subcarriers is selected such that in the frequency space for that frequency at which the signal of a subcarrier is evaluated, the signals of the other subcarriers exhibit a zero crossing. The subcarriers are thus orthogonal to each other. A spectral overlapping of the subcarriers and as a result a high packing density of the subcarriers is allowed, since the orthogonality ensures that the individual subcarriers can be distinguished. A better spectral efficiency than with simple FDM (Frequency Division Multiplexing) is thus achieved.

Because of the dispersion behavior of radio channels it is advantageous, in OFDM systems, to introduce a diversity, into the space area for example, in order to increase the reliability of data transmission. To do this a plurality of antennas are used on the transmit side which each transmit the same information. On receipt the signals subject to different fluctuations are combined. Examples of such methods are the CDD (Cyclic Delay Diversity) method presented in A. Damman, S. Kaiser: Low Complex Standard Conformable Antenna Diversity Techniques for OFDM Systems and its Application to the DVB-T System, Proceedings of the 4th International ITG Conference on Source and Channel Coding, Berlin 2002, in which virtual echoes of the signal sent on an antenna are created by the different antennas. However in A. Huebner, M. Bossert, F. Schuehlein, H. Haas, E. Costa: On Cyclic Delay Diversity in OFDM Based Transmission Schemes, Proceedings of the 7th International OFDM Workshop, Hamburg 2002 it is shown that this method can only be viably used in combination with channel encoding, such as convolutional encoding, to reduce transmission errors.

Furthermore, for OFDM transmission with a plurality of antennas, the Alamout method in accordance with S. M. Alamouti: A Simple Transmit Diversity Technique for wireless Communications, IEEE Journal on Selected Areas in Communications, vol. 16, no. 8, P. 1451-1458, October 1998 can be used, in which two consecutive symbols are processed on the transmit side such that two transmit antennas transmit orthogonal signals. A disadvantage of the Alamouti method has proved to be the need to use an expensive, modified demodulator on the receive side, and that a plurality of antennas cannot be used for the transmission without resulting in restrictions as regards the choice of the modulation method.

Furthermore the "Permutation Transmitter Diversity" method can be used for OFDM transmission with a plurality of antennas, said method being presented for example in Li, Y: "Transmitter Diversity for OFDM Systems and Its Impact on High-Rate Data Wireless Networks", IEEE Journal on Selected Areas in Communications, Vol. 17, No. 7, July 1999. In this case the signals of an antenna are permutated before of an inverse Fourier transformation in relation to the signals of another antenna.

SUMMARY OF THE INVENTION

One possible object of the invention is to demonstrate a method and a transmitter of the type specified at the start which allows an efficient transmission of data in a multi-carrier system using space diversity.

The inventors propose a method for transmitting data by radio in which a frequency band divided into a plurality of subcarriers and a plurality of antennas is used. The data is divided up in accordance with the number of the plurality of subcarriers into a number of elements to be transmitted by each antenna in each case. In this case a subcarrier is assigned for transmission for each antenna of each element. At least two antennas transmit different elements on at least one subcarrier. Before an OFDM modulation, for each antenna each element is multiplied by an antenna-specific and element-specific factor.

The number of elements of the data corresponds to the number of subcarriers. Each antenna transmits each element on a subcarrier, with not all antennas transmitting the elements on the same subcarriers. In particular it is possible for an element to be transmitted from each of the antennas on a different subcarrier. This can also apply to all elements. The OFDM modulation serves to prepare the signal for transmission, it comprises an inverse Fourier transformation in which the signal is transformed from the frequency domain into the time domain. Before the OFDM modulation each element to be transmitted by an antenna is multiplied by an antenna-specific and element-specific factor. This factor differs as a rule for all elements to be transmitted by an antenna and also for each element to be transmitted by different antennas. It is however also possible for it to be the same for different elements to be transmitted by one or more antennas, in which case however the relevant element and the relevant antenna must basically be included in the specifications in which the factor is defined.

The factor is in particular a complex or real number amounting to 1. This can be implemented by multiplication with an exponential function with a corresponding complex or real component. This multiplication corresponds to a phase shift of a signal.

In the method for transmitting data by radio a frequency band divided up into a plurality of subcarriers and a plurality of antennas is used for transmission. The data is divided up in accordance with the number of the plurality of subcarriers into a number of elements to be transmitted by each antenna in each case. For each antenna each element is assigned to a subcarrier for transmission in each case. At least two antennas transmit different elements on at least one subcarrier. After an OFDM modulation, there is a re-arrangement of the time sequence for at least one antenna of the time-dependent signals produced because of the OFDM modulation.

Whereas in the method described first the multiplication by the antenna-specific and element-specific factor is undertaken before the OFDM modulation, the re-arrangement of the time sequence is undertaken in the method described as the second method after the OFDM modulation. These two solutions for achieving the above object are however equally valid. Thus it can be shown mathematically that the re-arrangement of the timing sequence of the signal after the OFDM modulation is of equal significance to the multiplication of the signal before the OFDM modulation by a corresponding antenna-specific or element-specific factor.

In particular the re-arrangement of the timing sequence occurs for at least two antennas in accordance with a common pattern. It is especially advantageous for the re-arrangement of the timing sequence to be undertaken in accordance with a common pattern for all antennas. A pattern in this case means a set of specifications in accordance with which the re-arrangement is performed. The common pattern can for example involve a cyclic permutation. With a cyclic permutation, parts of the signal are interchanged in their sequence in a regular way such that once a cycle is completed in the given case after the number of permutations which corresponds to the number of the antennas, the original sequence is restored.

In one embodiment the assignment of the elements to subcarriers is undertaken for at least two antennas in accordance with a common pattern, such as for example in accordance with a cyclic permutation. it is especially advantageous if for all antennas the assignment of the elements to subcarriers is undertaken according to a common pattern.

The method may lead to a marked improvement compared to the method described above.

The transmit device for transmitting data by radio via a plurality of antennas uses a frequency band subdivided into a plurality of subcarriers for transmission. The transmit device includes means for dividing up the data into a plurality of elements corresponding to the number of the plurality of subcarriers to be transmitted by each antenna in each case, as well as means for assigning the elements to a subcarrier in each case for transmission for each antenna such that at least two antennas transmit different elements on at least one subcarrier.

In accordance with the invention the transmit device further includes means for multiplying each element for each antenna by an antenna-specific and element-specific factor before OFDM modulation. Alternatively it can include means for rearranging the timing sequence of the time-dependent signals produced as a result of the OFDM modulation for at least one antenna after the OFDM modulation.

The transmit device is especially suited to carrying out the method. It can feature further means for doing so.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
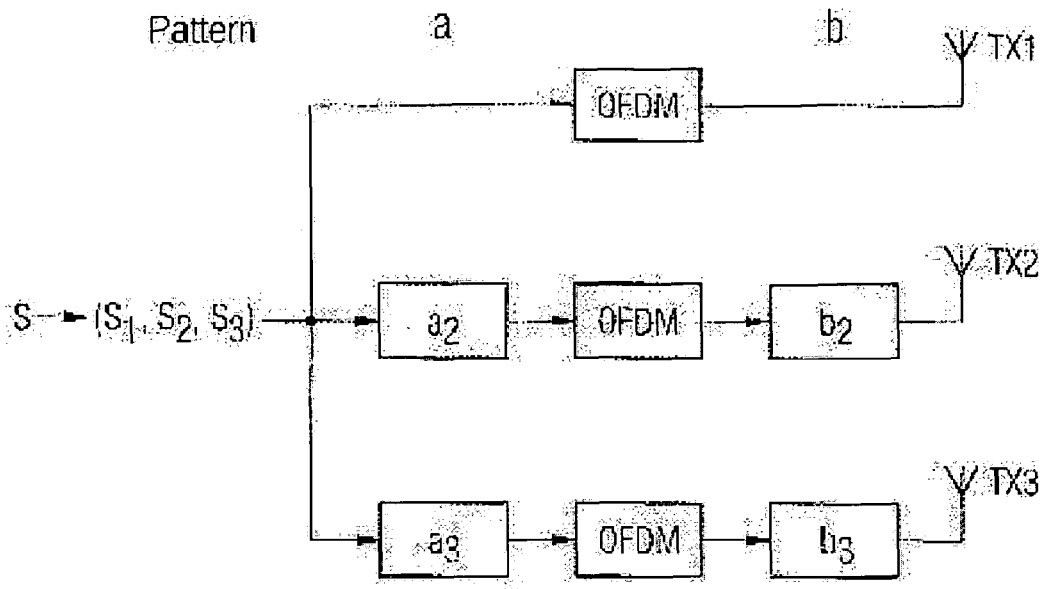
FIG. 1 shows a first schematic diagram of a processing sequence according to an embodiment of the invention.

Reference will now be made in detail to the preferred embodiments of the present invention, examples of which are illustrated in the accompanying drawings, wherein like reference numerals refer to like elements throughout.

The exemplary embodiment relates to an OFDM system, e.g. in accordance with the standards IEEE 802.16a or HIPERLAN/2. The transmission of data using three transmit antennas is considered.

In FIG. 1, from the data S to be sent a vector with elements $S_1$, $S_2$ and $S_3$ is formed. The elements $S_1$, $S_2$ and $S_3$ are symbols which are each to be transmitted on a subcarrier of the frequency bandwidth available for transmitting the data. In this case a larger number of subcarriers than three can be available in the OFDM system for data transmission, but these are not relevant to this discussion.

The vector with elements $S_1$, $S_2$ and $S_3$ is fed into three branches which come out into three antennas TX1, TX2 and TX3. In a first step the vector with the elements $S_1$, $S_2$ and $S_3$ is subjected to a cyclic shift or permutation in accordance with pattern a, with the shift within the first branch representing an identity operation and thus is not shown in FIG. 1, while the shift in the second and the third branch is undertaken in accordance with specifications $a_2$ and $a_3$. The result of this first step is then the following matrix:

$$\vec{S}_a = \begin{pmatrix} S_1 & S_2 & S_3 \\ S_2 & S_3 & S_1 \\ S_3 & S_1 & S_2 \end{pmatrix}$$

The first column of the matrix Sa in this case represents the symbols $(S_1,S_2,S_3)$ which are to be transmitted via the first antenna TX1, the second and the third columns accordingly contain those symbols $(S_2,S_3,S_1)$ and $(S_3,S_1,S_2)$ which are to be transmitted by the second and the third antennas TX2 and TX3. The first row of the matrix Sa contains those symbols $(S_1,S_2,S_3)$ which are to be transmitted on the first subcarrier, in the second and third row are those symbols $(S_2,S_3,S_1)$ and $(S_3,S_1,S_2)$ which are to be transmitted on the second and the third subcarrier. It can be seen that each antenna transmits each element $S_1$, $S_2$ and $S_3$ on precisely one subcarrier, with none of the elements $S_1$, $S_2$ and $S_3$ of a number of antennas being transmitted on the same subcarrier.

The common pattern underlying the assignment of the elements $S_1$, $S_2$ and $S_3$ to the subcarriers of the cyclic shift in a frequency space for the three antennas TX1, TX2 and TX3 operates such that for the first antenna TX1 the three elements $S_1$, $S_2$ and $S_3$ are distributed to the subcarriers in their original sequence. For the second antenna TX2 the first element $S_1$ occupies the last place in the above matrix diagram a, with the second and the third elements $S_2$ and $S_3$ moving forward to the first two subcarriers, so that overall compared to the assignment of first antenna TX1 each element $S_1$, $S_2$ and $S_3$ has been shifted upwards by one subcarrier. For the third antenna TX3 a further shift of the sequence of the second antenna TX2 upwards by one subcarrier occurs in the above matrix diagram.

Subsequently the OFDM modulation OFDM occurs in FIG. 1. In this case the frequency-dependent signals of the individual antenna branch each undergo an inverse Fourier transformation and a parallel-serial conversion.

The result of this is a time-dependent signal. In the form of a matrix this signal can be represented as follows:

$$\vec{S}_{OFDM} = \begin{pmatrix} q_1 & q_4 & q_7 \\ q_2 & q_5 & q_8 \\ q_3 & q_6 & q_9 \end{pmatrix}$$

The first column of the matrix $\hat{S}_{OFDM}$ after OFDM modulation OFDM has been completed. In this case represents the symbols $(q_1,q_2,q_3)$ which are to be transmitted via the first antenna TX1 the second and the third columns accordingly contain the symbols $(q_4,q_5,q_6)$ and $(q_7,q_8,q_9)$ which are to be transmitted by the second and the third antenna TX2 and TX3. In the first row of the matrix $\hat{S}_{OFDM}$ there are those symbols $(q_1,q_4,q_7)$ which are to be transmitted at a first point in time, in the second and third rows those symbols $(q_2,q_5,q_8)$ and $(q_3,q_6,q_9)$ which are to be transmitted at a second and third points in time.

In a further processing step the matrix $\hat{S}_{OFDM}$ is processed in accordance with pattern b which in its turn corresponds to a cyclic shift. The shift within the first branch represents an identification operation and is thus not shown in FIG. 1, while the shift in the second and the third branch is undertaken in accordance with specifications $b_2$ and $b_3$. The cyclic shift is performed in accordance with the sequence described above, resulting in the following matrix:

$$\vec{S}_b = \begin{pmatrix} q_1 & q_5 & q_9 \\ q_2 & q_6 & q_7 \\ q_3 & q_4 & q_8 \end{pmatrix}$$

Before the data S is transmitted in the form of the matrix $\hat{S}_b$ a guard period is inserted for each antenna TX1, TX2 and TX3 to reduce interference to the subsequent data to be transmitted. The antennas TX1, TX2 and TX3 then transmit the symbols in the corresponding sequence, for the first antenna TX1 that is q1 for example, followed by q2, q3 and the guard period.

The method has thus combined both a cyclic shift in the frequency range, i.e. over the different subcarriers, with of a cyclic shift in the time range.

The second step of the cyclic shift in time range according to pattern b can also be achieved other than in the way shown in FIG. 1 by multiplying the individual entries $S_{a,kl}$ of the matrix Sa by a particular factor in accordance with $$\vec{S}_{b,kl}^{beforeOFDM} = S_{a,kl} \cdot e^{-1\frac{2\pi}{N}l\delta_k}$$

Subsequently each entry Sa,kl of the matrix Sa, indexed by k and l is multiplied by an exponential function. The variable N in the exponent stands for the number of antennas in this case. The whole number shift $\delta_k$ is subject to the condition $0 \leq \delta_k \leq N-1$.

For two antennas the shift $\delta_k$ can amount to e.g. 0 and $$\frac{N}{2}.$$

The exponential function used as a factor is element-specific and antenna-specific since the two indices k and l are components of the exponent. The shift $\delta_k$ can be defined so that in its final effect it corresponds to the pattern b. Then the result of the inverse Fourier transformation on OFDM modulation from the matrix $\vec{S}_b^{beforeOFDM}$ is the matrix shown above $\vec{S}_b$.

Figure 2A:
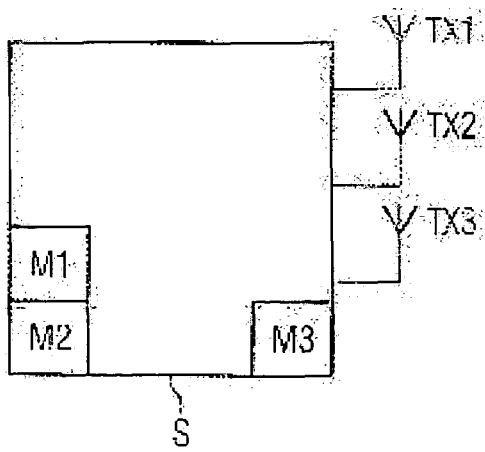
FIG. 2a shows a first i transmitter according to an embodiment of the invention.
Figure 2B:
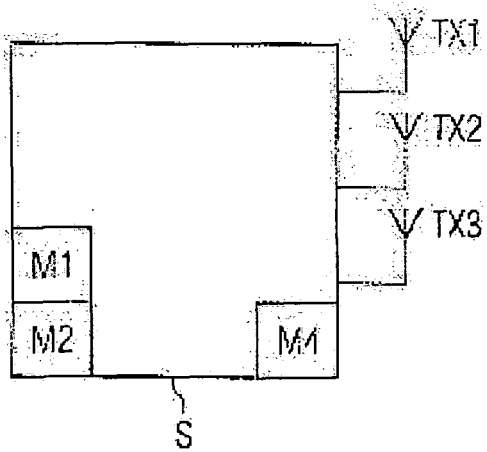
FIG. 2b shows a second transmitter according to an embodiment of the invention.

FIGS. 2a and 2b above each show a transmitter S with three antennas TX1, TX2 and TX3. This comprises means M1 for dividing the data into elements and means M2 for assigning the elements to a subcarrier for each antenna. The assignment is undertaken here in accordance with the cyclic shift described above. FIG. 2a shows the case where the second processing step occurs before the OFDM modulation. To this end the transmitter S features means M3 for multiplying the elements for each antenna by the antenna-specific and element-specific exponential factor. By contrast the second processing step occurs in the transmitter S of FIG. 2b, as also shown in FIG. 1, after the OFDM modulation. The transmitter S of FIG. 2b includes for this purpose means M4 to rearrange the timing sequence of the signal obtained by the OFDM modulation, with this rearrangement corresponding to the cyclic shift described above. To perform the OFDM modulation the two transmitters feature additional means not shown.

Although in the example described the shift of the signals in the frequency and in the time space occurred in the form of a cyclic shift in each case, other patterns such as for example statistically random patterns or other shift specifications can be used to perform this action.

The signal vector R received in the receiver is produced from, $$R = H \cdot S + N,$$

with H representing the matrix of the transmission scheme shown in FIG. 1 which is multiplied by the data S and N representing a noise vector.

If more than two transmit antennas are used, the method reduces the bit error rates (BER) of the data transmission compared to the Alamouti method. A further advantage of the method lies in the fact that it can be used for any number of antennas. It is also possible to use any modulation alphabet in combination with the method described above. Furthermore the method can be used with a simplified structure of the receiver compared to a known method and a known transmitter.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:
1. A method of transmitting data by radio, comprising:
using a plurality of subcarriers of a frequency band and a plurality of antennas for transmission such that each antenna transmits data using the plurality of the subcarriers;

dividing data for transmission into a plurality of elements such that the number of data elements corresponds to the number of subcarriers;

for each antenna, assigning each element to a subcarrier for transmission, such that for at least two antennas and at least one subcarrier, different elements are assigned to said one subcarrier; and before performing an OFDM modulation for each antenna, multiplying each element by an antenna-specific and an element-specific factor.

2. The method in accordance with claim 1, wherein the factor is a complex or real number, the absolute value of the factor being 1.

3. The method in accordance with claim 1, wherein for at least two antennas a common pattern is used to assign each element to a corresponding subcarrier.

4. The method in accordance with claim 3, wherein the common pattern is a cyclic permutation.

5. A method of transmitting data by radio, comprising:
using a plurality of subcarriers of a frequency band and a plurality of antennas for transmission such that each antenna transmits data using the plurality of the subcarriers;

dividing data for transmission into a plurality of data elements such that the number of data elements corresponds to the number of subcarriers;

for each antenna, assigning each element to a subcarrier for transmission, such that for at least two antennas and at least one subcarrier, different elements are assigned to said one subcarrier;

performing an OFDM modulation for each antenna to produce timing sequences of time-dependent signals; and for at least one antenna, rearranging the order of the time-dependent signals after OFDM modulation.

6. The method in accordance with claim 5, wherein for at least two antennas, the order is rearranged in accordance with a rearrangement common pattern.

7. The method in accordance with claim 6, wherein the rearrangement common pattern is a cyclic permutation.

8. The method in accordance with claim 7, wherein for at least two antennas an assignment common pattern is used to assign each element to a corresponding subcarrier.

9. The method in accordance with claim 8, wherein the assignment common pattern is a cyclic permutation.

10. The method in accordance with claim 5, wherein for at least two antennas a common pattern is used to assign each element to a corresponding subcarrier.

11. The method in accordance with claim 10, wherein the common pattern is a cyclic permutation.

12. A transmitter to transmit data by radio using a plurality of subcarriers of a frequency band and a plurality of antennas for transmission such that each antenna transmits data using the plurality of subcarriers, comprising:

division means for dividing the data into a plurality of elements such that the number of elements corresponds with the number of subcarriers;

assignment means for assigning each element to a corresponding subcarrier, the elements being assigned individually for each antenna such that for at least two antennas and at least one subcarrier, different elements are assigned to said one subcarrier; and an OFDM modulator to perform OFDM modulation for each antenna to produce time-dependent signals;

wherein the transmitter comprises either:

multiplication means for multiplying each element for each antenna by an antenna-specific and element-specific factor before OFDM modulation (OFDM), or rearrangement means for rearranging the order of the time-dependent signals after OFDM modulation.

\* \* \* \* \*